Figure 2:
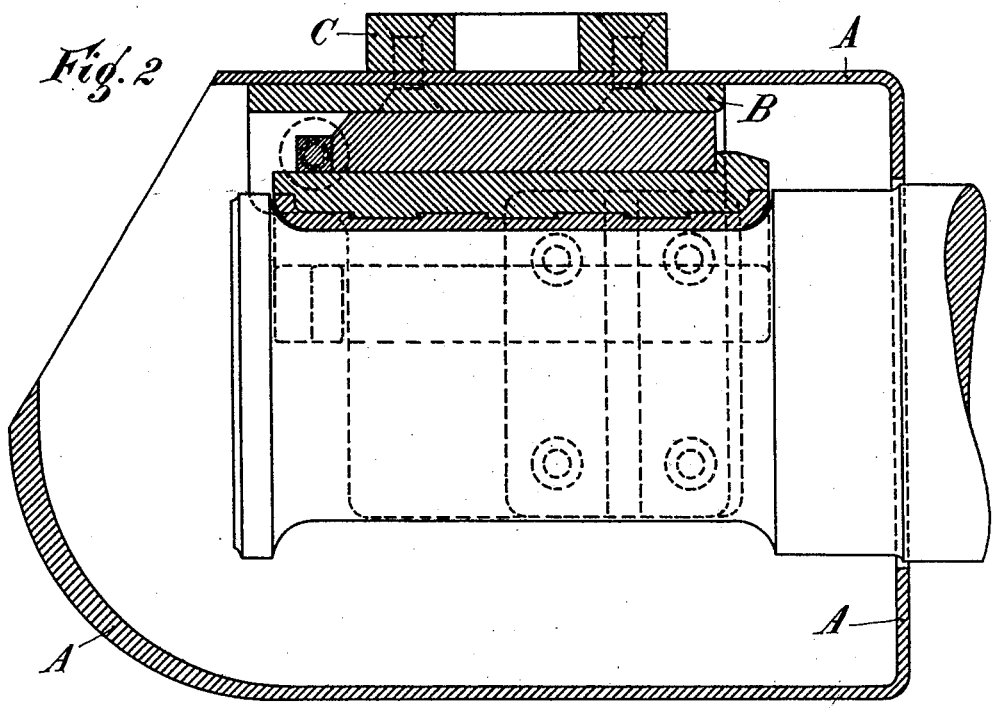

No. 809,404. PATENTED JAN. 9, 1906.
H. STÜTING.
AXLE BOX FOR RAILWAY CARS.
APPLICATION FILED MAR. 17, 1903.

7 SHEETS—SHEET 1.

Witnesses:

Inventor:
Heinrich Stüting,
by Max Singer
his attorney

No. 809,404. PATENTED JAN. 9, 1906.
H. STÜTING.
AXLE BOX FOR RAILWAY CARS.
APPLICATION FILED MAR. 17, 1903.
7 SHEETS—SHEET 2.
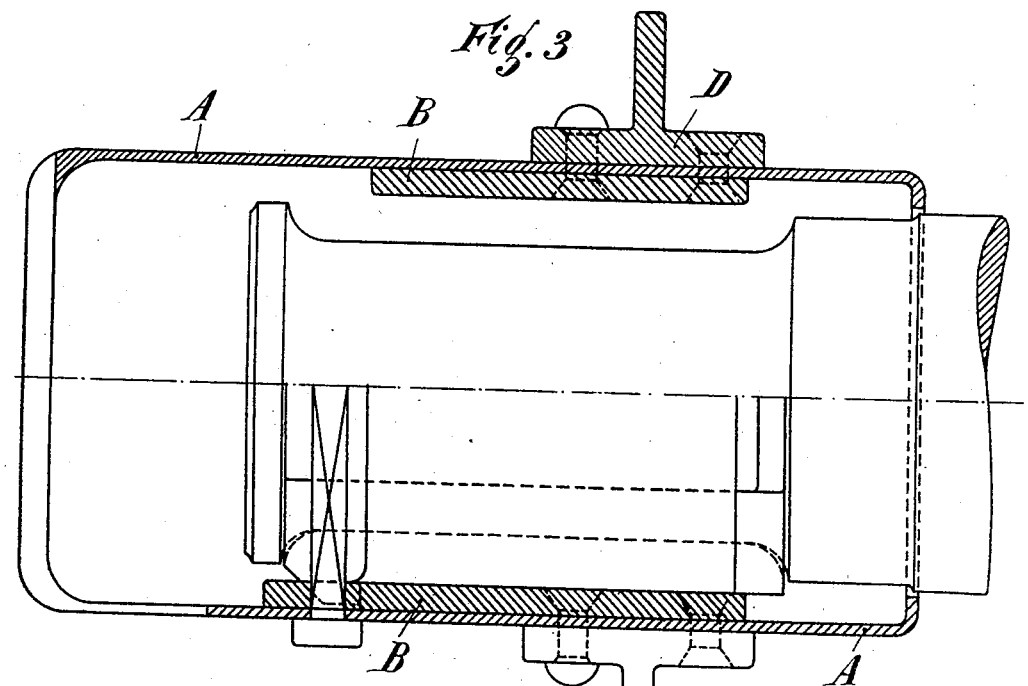
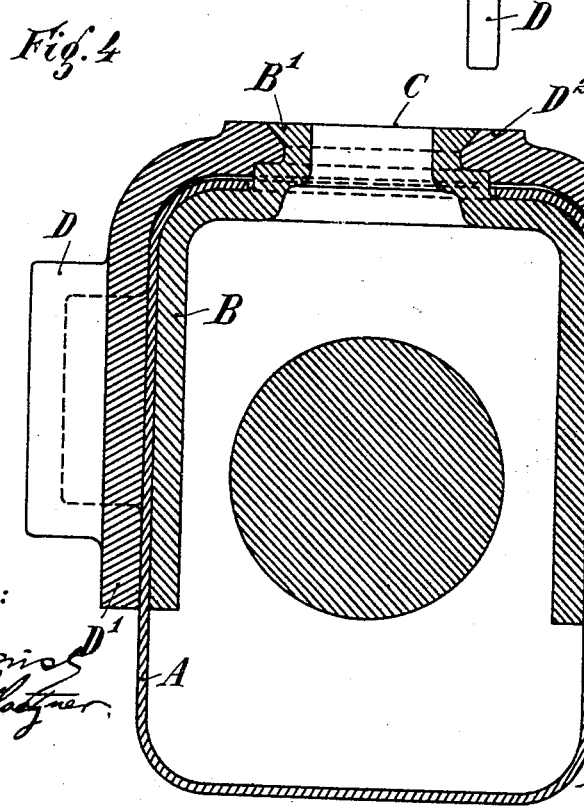

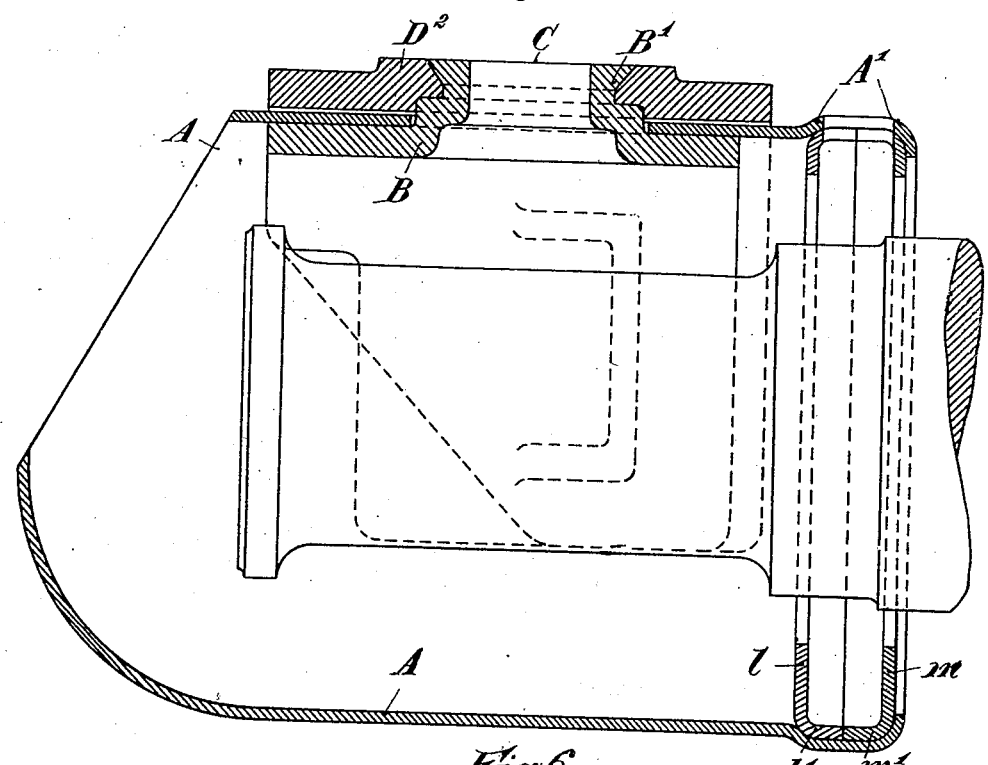
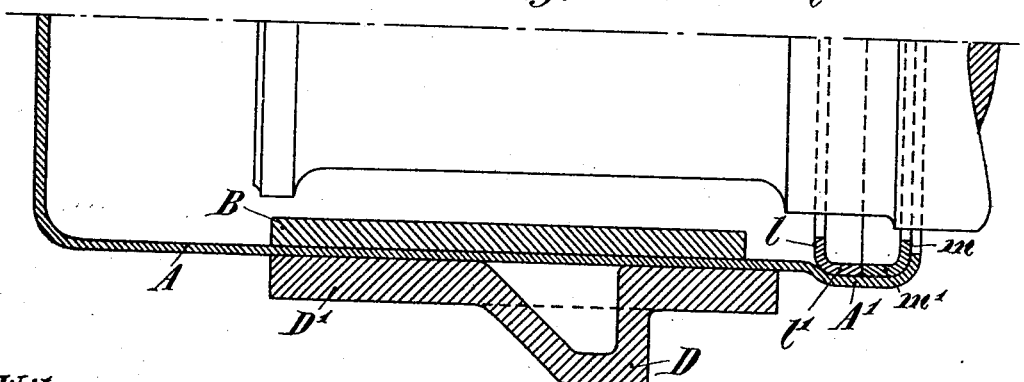

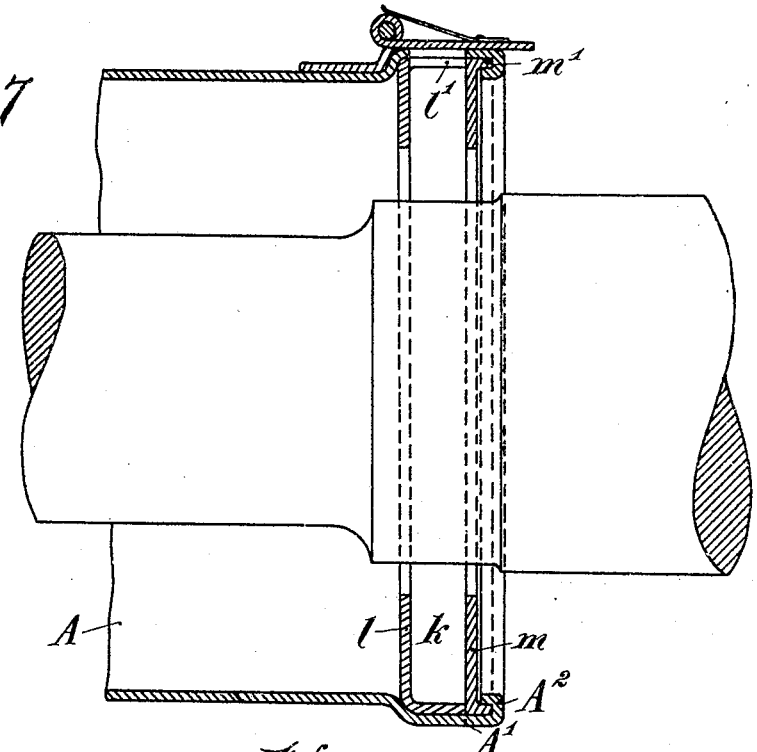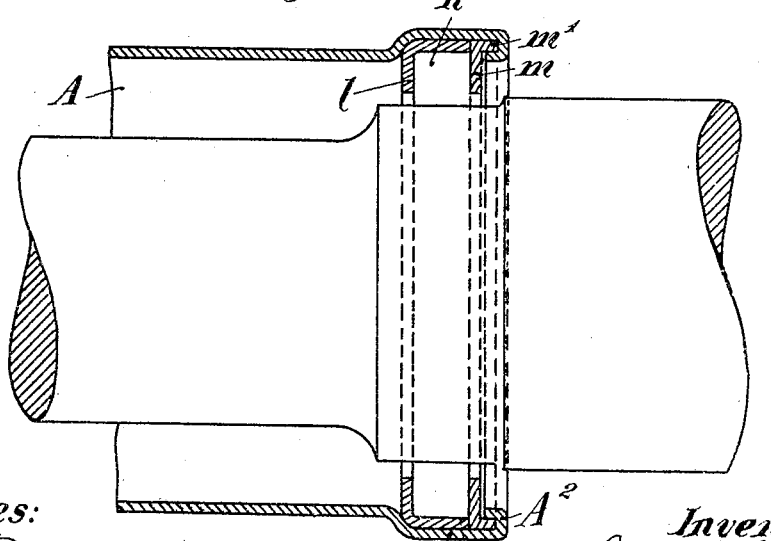

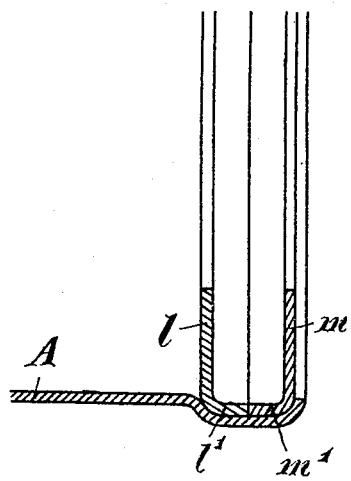
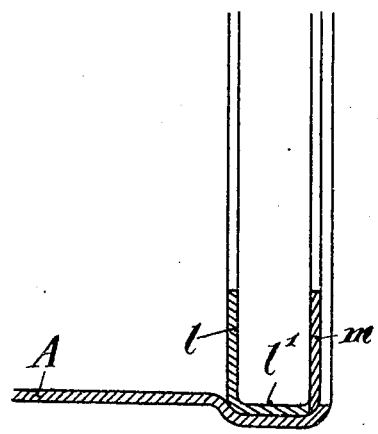
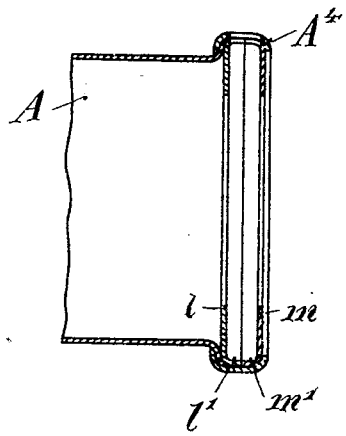
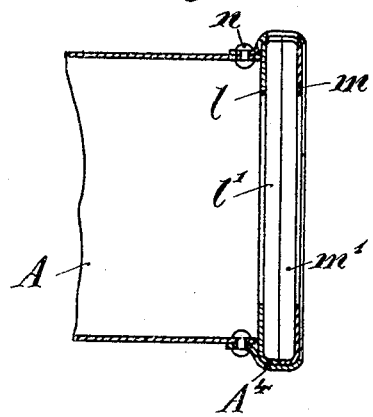

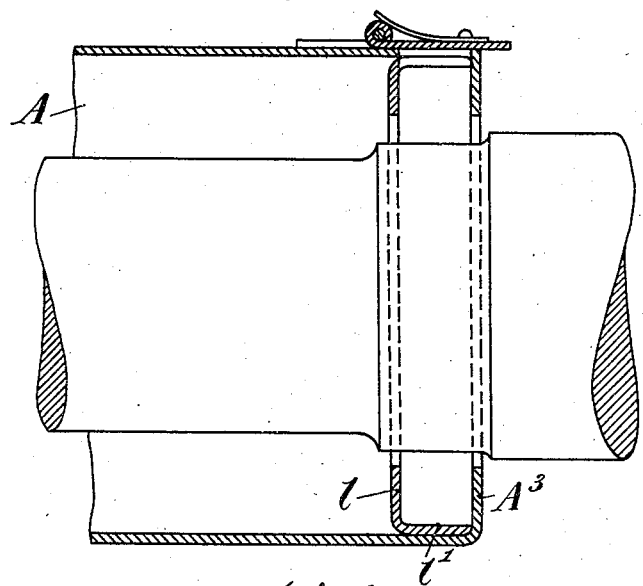
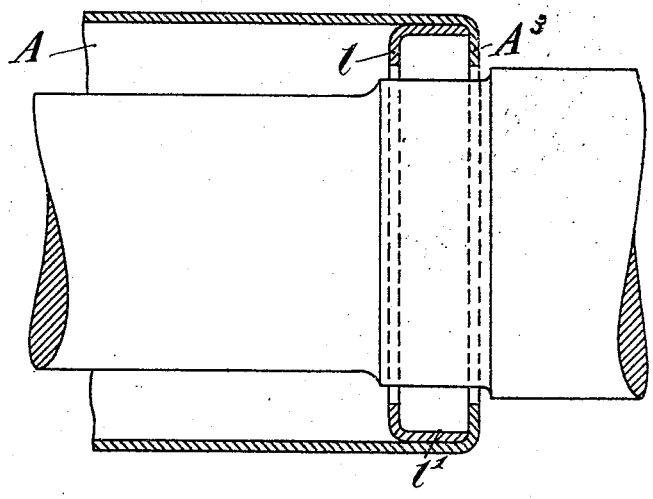

No. 809,404. PATENTED JAN. 9, 1906.
H. STÜTING.
AXLE BOX FOR RAILWAY CARS.
APPLICATION FILED MAR. 17, 1903.

7 SHEETS—SHEET 7.

Witnesses:

Inventor:
Heinrich Stüting,
by Max _____
his Attorney.

UNITED STATES PATENT OFFICE.

HEINRICH STÜTING, OF WITTEN, GERMANY.

AXLE-BOX FOR RAILWAY-CARS.

No. 809,404.      Specification of Letters Patent.      Patented Jan. 9, 1906.

Application filed March 17, 1903. Serial No. 148,166.

*To all whom it may concern:*

Be it known that I, HEINRICH STÜTING, manager of the Wittener Stahlröhrenwerke, a subject of the King of Prussia, German Emperor, residing at Witten-on-the-Ruhr, in the Kingdom of Prussia, German Empire, have invented certain new and useful Improvements in Axle-Boxes for Railway-Cars and other Vehicles, of which the following is a specification, This invention relates to axle-boxes for railway-cars and other vehicles; and my improvements in such boxes relate to means by which is attained a great strength or stability and a very low weight of said boxes, as well as a secure shutting off of the oil on the one hand and of dust on the other.

Car-axle boxes manufactured entirely from cast-iron require thick walls, so that they are consequently very heavy. To overcome this drawback, axle-boxes have been made which consist either entirely of wrough-iron or partly of such and partly of cast-iron; but even by these constructions the purposes in view have not been satisfactorily attained for the reasons following: In the axle-boxes made entirely of wrought-iron the box proper has been used as an intermediate piece located between the saddle and the box-guides, so as to transmit the shocks. The thickness of the walls of the box proper was therefore of necessity sufficient to resist the said shocks; but as only the upper part of the walls of the box, or, more precisely, that portion of the upper part which is located at the place of union between the saddle and the guides, is exposed to strains of the kind in question, all the other parts or walls of the box proper have been by far heavier than is necessary to obtain a secure shutting off of the oil and dust, and the weight of the axle-box was thus unnecessarily increased. In the other axle-boxes where the upper half consisted of cast-iron and the lower half of wrought-iron it was necessary that the upper half, in order to be able to resist the shocks, corresponded in weight to the upper half of those boxes which consisted entirely of cast-iron. There was thus only a partial reduction of weight obtained. Moreover, this reduction of weight was admissible only if the connection of the cast-iron with the shutting-off device for oil and dust was made at such a portion of the box sufficiently low that the shocks were transmitted from the saddle to the guides, and reversely by the mediation of the massive cast-iron body used for the connection. If the cast-iron part of the box proper extends so far upward that a portion of the upper part is separated from the lower part by the box-plate, it is necessary to give the walls a greater thickness, so as to obtain by this means the requisite strength of the whole. A very great part of the reduction of weight obtained by making the lower half of the box of wrought-iron is thus rendered nugatory by the necessary increase of the thickness of the walls of the upper half. The weakening of the cast upper part of the box caused by the division of that part in consequence of the insertion of the box-plate has been sought to be overcome by perforating the latter at as many places as possible before being united by casting with the said upper part. By this means, it is true, the cast body becomes again massive; but the interruptions remaining at the non-perforated portions of the cast body must still be compensated for by the heavier weight of the latter. The lightest box, after all, has been doubtless that in which the upper cast-iron half consisted of one piece; but even in this construction only a partial reduction in weight, in so far as the lower half of the box was concerned, is attained, and, moreover, that reduction is attained by the employment of cast-iron, which owing to its nature is not well suited for the transmission of shocks. Another objection to the car-axle boxes of known construction resides in the packing for retaining the oil and excluding the dust, which has been by no means satisfactorily attained. Paying no particular regard to cast-iron boxes in which the chamber is cast integrally with the body and which cannot be recommended at all because of their insufficient strength, there are pressed boxes with a single bottom or with a double bottom to be considered. Boxes with single bottom only are possessed of the serious drawback that the excellent method of packing by means of packing-rings acting upon both sides of the chamber cannot be used with them. Therefore when employing such boxes packing devices of particular constructions acting from the outside against that single bottom must be made use of, without, however, attaining by any of them a packing of satisfactory attributes. To make it possible to use packing-rings in connection with pressed boxes, endeavors have been made to provide these latter with two walls by turning the thick bottom by bordering into a double bottom constituting a chamber adapted to receive the packing-ring. This form of construction is not only expensive and of difficult production, but has also the drawback that a working of the tightening-surfaces of the chamber is nearly impossible and no secure tightening is therefore obtainable.

All the aforementioned difficulties are overcome by the present invention which relates to a car-axle box in which great strength and lightness are combined with a secure shutting up of oil and exclusion of dust.

In order to make my invention clearly understood, I refer to the accompanying drawings, in which similar letters denote similar parts throughout the several views, and in which—

Figure 1:
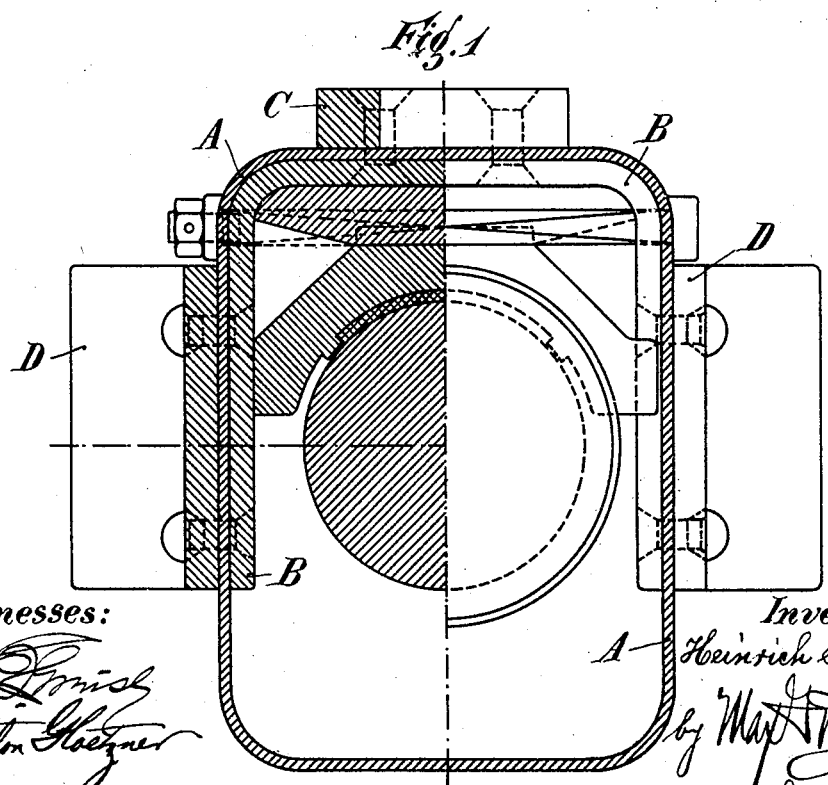

Figure 1 shows the improved car-axle box, partly in front view and partly in vertical section. Fig. 2 is a central vertical longitudinal section of Fig. 1. Fig. 3 is a central vertical longitudinal section of the left-hand side of Fig. 1. Fig. 4 is a vertical cross-section through a slightly-modified construction. Fig. 5 is a central vertical longitudinal section of the box in connection with my improved form of packing-chamber. Fig. 6 is a central horizontal section of Fig. 5. Fig. 7 is a central vertical section through the packing-chamber. Fig. 8 is a central horizontal section of Fig. 11; and Figs. 9, 10, 11, 12, 13, 14, 15, 16, 17, 18, 19 are slightly-varied forms of the packing-chamber, all of which are more fully referred to in the detailed parts of this specification.

My improved car-axle box consists in every case of wrought-iron.

In the form of construction shown in Figs. 1 to 3 the connection between the saddle C and the guides D is formed by a bow-shaped rigid intermediate piece B, preferably formed of wrought-iron, which is connected with the parts C and D by means of rivets, in such a manner that the shocks coming from the axle are by said intermediate piece transmitted directly to the spring-casing and the axle-holder independent of the comparatively light wrought-iron box A. The intermediate piece B, the dimensions of which are such that it can stand the severest shock without any risk whatever, may have in every case such a shape as is most suited for the purpose intended.

Figs. 4 to 6 show different forms of construction in which the connection of the various parts with each other is effected without the employment of rivets. In the form of execution represented in Figs. 4 to 6 the saddle C is formed integral with the upper portion $D^2$ of a bow-shaped body $D'$, which forms also the guides D, the neck-shaped part $B'$ of the intermediate piece B taking through an opening in that portion of the part $D^2$ forming the saddle. The upper circumferential surface of that opening is funnel-shaped, and the part $B'$ is pressed into that funnel-shaped portion forming a flange, so that thereby a firm connection of the parts in question is obtained. In an equivalent form of construction the saddle C, the intermediate piece, and the guides consist all together of one piece, being formed integral in the process of manufacture, and thus secured together, in the language of the claims.

In all the examples aforedescribed the box or casing A is perfectly relieved from the shocks coming from the axle in so far as it need not any more transmit the same, the immediate connection, or even integral union of the saddle, the intermediate piece and the guides making that unnecessary. The casing A serves now solely for retaining the oil and shutting off the dust. The thickness of its walls may therefore be slight, so that its weight does not any more form a point to which particular attention must be paid.

Figure 15:
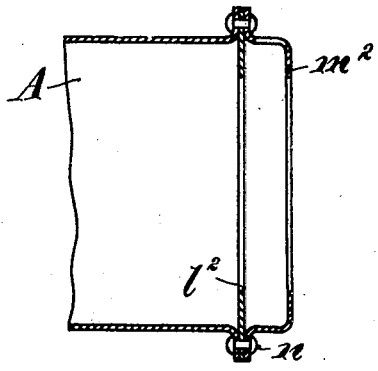
Figure 16:
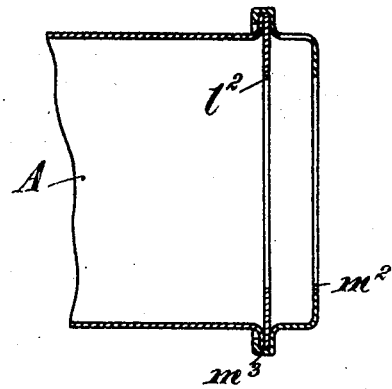
Figure 17:
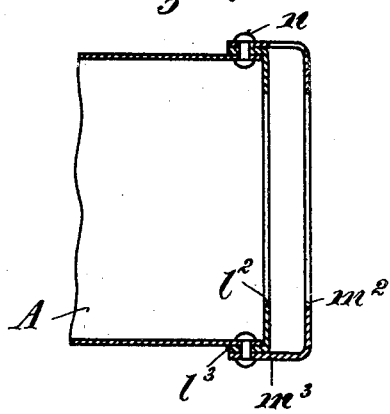
Figure 18:
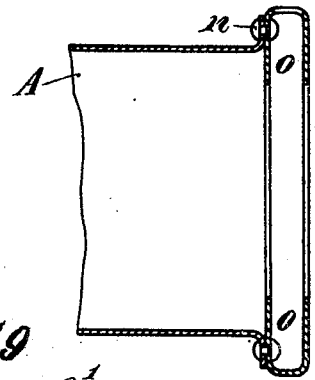
Figure 19:
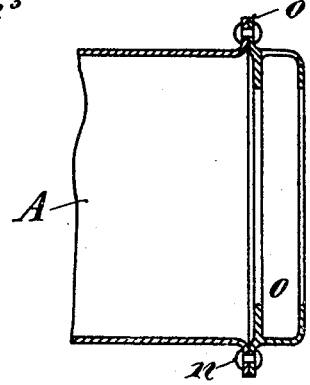

The packing-chamber used in connection with my improved car-axle box is shown in Figs. 5, 6, and 7 to 19. In the form of execution represented in Figs. 7 and 8 the packing-chamber $k$ is formed by and between two plates $l$ and $m$, having each a suitably large aperture for the axle. The plates are held in and by an enlarged or widened part $A'$ of the box-casing A, which has a bent-round portion $A^2$, taking over a bent-off rim $m'$ of the plate $m$. The other plate has a rim $l'$ lying against the rear side of the plate $m$. It is obvious that after the packing-rings have been introduced into the chamber $k$ the packing or shutting off thus obtained is just as excellent as with cast boxes where the packing-chamber is formed by a double bottom cast integrally with the box or casing. In the form of execution represented in Figs. 5, 6 and 9, 11, and 12 the plates $l$ and $m$ are of equal shape, and the rim $m'$ of the plate $m$ rests against the rim $l'$ of the plate $l$. In Fig. 10 there is but one rim, $l'$, the plate $m$ being perfectly flat. In Figs. 13 and 14 the outer wall of the packing-chamber is formed by a suitably-bent portion $A^3$ of the box or casing A, and in Fig. 12, which with respect to the plates $l\ l'$ and $m\ m'$ is similar to Fig. 9, these plates are connected with each other and with the box A by means of a suitably-shaped ring $A^4$, also the adjacent edge of the box being so shaped that the ring $A^4$ can take over this edge. In the case of an unbent edge the connection of the ring $A^4$ with the box A is effected by rivets $n$. Fig. 15 shows a form of construction in which a flat plate $l^2$ and a vessel-shaped plate $m^2$ are connected by rivets with a flange of the box, the plate $m^2$ having also a flange, the plate $l^2$ being located between the two flanges and the rivets $n$ passing through all these parts together. In Fig. 16 the flange $m^3$ of the plate $m^2$ is bent around the other two parts, and in Fig. 17 both plates are vessel-shaped, the adjacent edge of the box is similar to that of Fig. 12, the rim $l^3$ of the plate $l^2$ takes over that edge, and the rim $m^3$ of the plate $m^2$ takes over the rim $l^3$. Figs. 18 and 19 show two forms in which the packing-chamber consists of one piece. In both forms the box A has a flange, as in Fig. 15. In Fig. 18 the packing-chamber $o$ is riveted directly to that flange; but in Fig. 19 the packing-chamber is also provided with a flange $o'$, and the two flanges are riveted together.

Having now described my invention, what I desire to secure by a patent of the United States is—

1. In a car-axle box, the combination, with the saddle and guides, and a rigid wrought-iron piece secured to the saddle and guides, of a comparatively light wrought-iron casing secured to said piece and serving to inclose the axle.

2. In a car-axle box, the combination, with the saddle and guides, and a rigid piece secured to the saddle and guides, of a wrought-iron casing secured on the outer side of said piece and serving to inclose the axle.

3. In a car-axle box, the combination, with the saddle and guides, and a rigid piece secured to the saddle and guides, of a comparatively light casing secured between the guides and said piece and serving to inclose the axle.

4. In a car-axle box, the combination, with the saddle and guides, and a rigid piece secured to the saddle and guides by means of a flange, of a comparatively light casing secured between the guides and said piece and serving to inclose the axle.

5. In a car-axle box, the combination, with the saddle and guides, and a rigid wrought-iron piece secured to the saddle and guides and adapted to sustain the shocks transmitted thereby, of a comparatively light casing of wrought-iron arranged between the guides and said piece and serving to inclose the axle, the connection between the rigid piece and the saddle and guides being by a flange in such manner as to rigidly clamp the casing between the piece and guides.

6. In a car-axle box, the combination, with the saddle and guides, and a rigid piece secured to the saddle and guides, of a comparatively light casing secured to said piece and serving to inclose the axle, and a partition arranged within the casing in such manner as to form a packing-chamber.

7. In a car-axle box, the combination, with the saddle and guides, and a rigid piece secured to the saddle and guides, of a comparatively light casing secured to said piece and serving to inclose the axle, said casing having an enlargement at one end, and spaced plates arranged within said enlargement in such manner as to form a packing-chamber.

8. In a car-axle box, the combination, with the saddle and guides, and a rigid piece secured to the saddle and guides, of a comparatively light casing secured to said piece and serving to inclose the axle, said casing having its inner end enlarged and bent inwardly, and a plurality of bent plates disposed within said casing in such manner as to form a packing-chamber.

9. In a car-axle box, the combination, with the saddle and guides, and a rigid wrought-iron piece secured to the saddle and guides, of a comparatively light casing secured to said piece and serving to inclose the axle, said casing having upon its inner end an enlargement, and perforated plates having flanged edges opposed to each other and arranged within the enlargement in such manner as to form a packing-chamber.

10. In a car-axle box, in combination, with the saddle and guides, and a rigid wrought-iron piece secured to the saddle and guides by means of a flange, of a comparatively light wrought-iron casing arranged between the guides and said piece and serving to inclose the axle, and spaced perforated plates disposed within said casing near the inner end in such manner as to embrace the axle and serve as a packing-chamber.

In witness whereof I have hereunto set my hand in presence of two witnesses.

HEINRICH STÜTING.

Witnesses:
A AEQUISTAPACE,
OTTO KÖNIG.